US011373041B2

(12) United States Patent
Ni et al.

(10) Patent No.: US 11,373,041 B2
(45) Date of Patent: Jun. 28, 2022

(54) TEXT CLASSIFICATION USING MODELS WITH COMPLEMENTARY GRANULARITY AND ACCURACY

(71) Applicant: International Business Machines Corporation, Armonk, NY (US)

(72) Inventors: Jian Ni, Millwood, NY (US); Radu Florian, Danbury, CT (US); Salim Roukos, Redondo Beach, CA (US); Vittorio Castelli, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 17/025,539

(22) Filed: Sep. 18, 2020

(65) Prior Publication Data

US 2022/0092262 A1    Mar. 24, 2022

(51) Int. Cl.
*G06F 40/279* (2020.01)
*G06F 40/205* (2020.01)
*G06F 40/253* (2020.01)
*G06F 40/30* (2020.01)

(52) U.S. Cl.
CPC .......... *G06F 40/279* (2020.01); *G06F 40/205* (2020.01); *G06F 40/253* (2020.01); *G06F 40/30* (2020.01)

(58) Field of Classification Search
CPC .... G06F 40/279; G06F 40/205; G06F 40/253; G06F 40/30; G06F 16/35
USPC .......................................................... 704/9
See application file for complete search history.

(56) References Cited

U.S. PATENT DOCUMENTS 9,223,779 B2    12/2015    Sun

FOREIGN PATENT DOCUMENTS

| CN | 101377769 A | 3/2009 |
| CN | 104408153 A | 7/2018 |

OTHER PUBLICATIONS

Anonymous. "Joint Text Classification on Multiple Levels with Multiple Labels." Under Review as a Conference Paper at ICLR 2020. 12 pages. https://openreview.net/attachment?id=BJIFzkSFwr &name=original_pdf.
Chen, M., et al., "Short Text Classification Improved by Learning Multi-Granularity Topics." Published Jul. 2011. Accessed Jun. 29, 2020. 6 pages. IJACI '11:Proceedings of the Twenty-Second international joint conference on Artificial Intelligence—vol. vol. Three. https://dl.acm.org/doi/10.5555/2283696.2283700.

(Continued)

*Primary Examiner* — Thierry L Pham
(74) *Attorney, Agent, or Firm* — Heather Johnston; Jared Montanaro

(57) ABSTRACT

A processor may receive a text segment. The processor may analyze the text segment at a plurality of granularity levels wherein each of the plurality of granularity levels has a comparative selection value for identifying one or more objects of interest within the text segment. The processor may select an optimized granularity level with an optimum comparative selection value. The processor may identify the one or more objects of interest within the text segment. The processor may display the one or more objects of interest to a user.

20 Claims, 9 Drawing Sheets

(56) References Cited

OTHER PUBLICATIONS

Mehri, S., et al., "Multi-Granularity Representations of Dialog." Published Nov. 2019. 10 pages. Proceedings of the 2019 Conference on Empirical Methods in Natural Language Processing and the 9th International Joint Conference on Natural Language Processing, pp. 1752-1761. Hong Kong, China. Published by Association for Computational Linguistics.

Mell, et al., "The NIST Definition of Cloud Computing," Recommendations of the National Institute of Standards and Technology, U.S. Department of Commerce, Special Publication 800-145, Sep. 2011, 7 pgs.

Qian, C., et al., "An Approach for Process Model Extraction by Multi-Grained Text Classification." Submitted May 16, 2019. Accessed Jun. 29, 2020. 2 pages. Published by ARXIV. https://arxiv.org/abs/1906.02127.

Shao, W., et al., "Nonuniform Granularity-Based Classification in Social Interest Detection." Published Jul. 6, 2017. 11 pages. Mathematical Problems in Engineering vol. 2017, Article ID 5054825. Published by Hindawi. https://doi.org/10.1155/2017/5054825.

Shivashankar, S., et al., "Multi Grain Sentiment Analysis using Collective Classification." Published Jan. 2010. 6 pages. http://ebooks.iospress.nl/publication/5887.

Wang, G., et al., "Granular computing: from granularity optimization to multi-granularity joint problem solving." Granul. Comput. (2017) 2:105-120. Published by Springer International Publishing. Switzerland, https://link.springer.com/article/10.1007/s41066-016-0032-3.

Xu, J., et al., "Short Text Hashing Improved by Integrating Multi-Granularity Topics and Tags." Published Mar. 10, 2015. 12 pages. Published by Institute of Automation, Chinese Academy of Sciences. China. https://arxiv.org/abs/1503.02801.

Yu, W., et al., "Information Mining Based on Multi-Granularity News Fusion." Published Dec. 13, 2013. 4 pages. Advanced Materials Research ISSN: 1662-8985, vols. 850-851, pp. 592-595. Published by Trans Tech Publications Ltd. Switzerland. https://www.scientific.net/AMR.850-851.592.

TEXT CLASSIFICATION USING MODELS WITH COMPLEMENTARY GRANULARITY AND ACCURACY

BACKGROUND

The present disclosure relates generally to the field of data classification and, more specifically, to detecting classifications of data using text analysis.

Text analysis automates understanding and sorting relevant data to make it easier to utilize. Text analysis tools may analyze text to detect keywords or phrases and apply relevant tags to pieces of the data. These tags may then be used to sort pieces of data into desired categories.

SUMMARY

Embodiments of the present disclosure include a method, system, and computer program product for text classification at multiple levels of granularity with different accuracies. A processor may receive a text segment. The processor may analyze the text segment at a plurality of granularity levels wherein each of the plurality of granularity levels has a comparative selection value for identifying one or more objects of interest within the text segment. The processor may select an optimized granularity level with an optimum comparative selection value. The processor may identify the one or more objects of interest within the text segment. The processor may display the one or more objects of interest to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
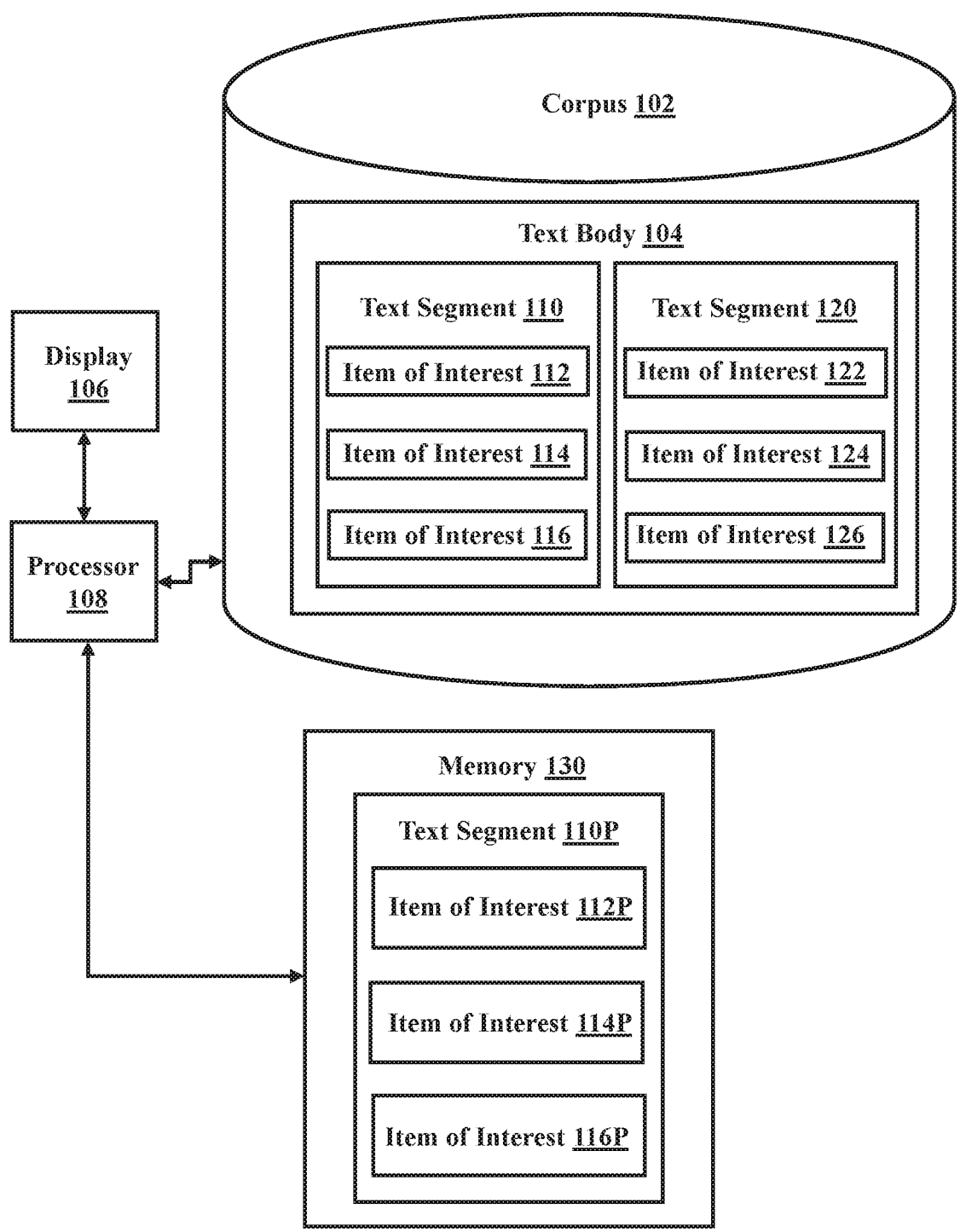
FIG. 1 illustrates a block diagram of a system of processing queries in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of data classification and, more specifically, to detecting classifications of data using text analysis. Additional aspects of the present disclosure will be apparent to those skilled in the art. Some of these aspects are described further below.

Currently, examining text for objects of interest is time consuming and requires screening of a text at one granularity level. Consequently, there is a need for an optimized approach for examining text on a correct, optimized granularity level the first time the text is screened.

Accordingly, embodiments of the present disclosure include a method, system, and computer program product for text classification at differing levels of granularity. Some embodiments of the method for combining multiple algorithms for text classification of a text may include a processor receiving a text segment, analyzing the text segment at a plurality of granularity levels wherein each of the plurality of granularity levels has a distinct comparative selection value for identifying one or more objects of text within the text segment, and selecting an optimized granularity level for the text segment. The optimized granularity level may have an optimum comparative selection value. The method may further include the processor identifying the one or more objects of interest within the text segment and displaying the one or more objects of interest to a user.

Some embodiments of the method may further include the processor determining a quantifiable benefit to a user for a correct answer at each applicable level of granularity. As such, a first function may have a first quantifiable benefit and a second function may have a second quantifiable benefit. Some embodiments may also include the processor determining a quantifiable cost to the user for an error at each applicable level of granularity. As such, a first function may have a first quantifiable cost and a second function may have a second quantifiable cost.

A correct answer is properly identifying a result. In other words, a correct answer is appropriately indicating an object of interest for a query or not identifying an object of interest where an object of interest does not exist. In a confusion matrix, a correct answer may be a result labeled as a true positive or a true negative. In contrast, an error is an improperly identified result. As such, an error is inappropriately indicating an object of interest or, alternatively, failing to indicate an object of interest for a query. In a confusion matrix, a result labeled as a false positive or a false negative may be an error.

An example may be that a processor operates a function at a fine granularity using sequence labeling and at a coarse granularity using sentence classification. At the fine granularity of sequence labeling, the function may find more objects of interest because the function is built to precisely extract the exact spans of text containing the objects of interest. However, because the fine-grained approach finds the exact spans without respect to the context, the accuracy may suffer: each exact span of text is tagged even if the context makes the reference irrelevant for the specific query (resulting in false positives) and any text with an inconsequential difference, such as a typographical error or a change of syntax, would not be reported (resulting in false negatives). Additionally, because a fine-grained approach analyzes the text in fine detail, the computational cost is higher than it would be in a coarse-grained approach, resulting in a longer latency and more computational resources than a coarse-grained approach. At the coarse granularity of sentence classification, the function may find fewer objects of interest because it identifies the objects of interest from the context of the sentence. The results may identify queries less precisely, failing to identify some objects of interest in contexts that do not trigger recognition; this may result in more true negatives and fewer false positives than a finer-grained approach, but it may also result in additional false negatives. Overall, a coarse-grained approach is likely to result in higher accuracy and lower sensitivity.

Some embodiments may also include the processor computing a confidence score for each of the functions (e.g., algorithms). As such, a first function may have a first confidence score and a second function may have a second confidence score. Some embodiments may also include the processor comparing the first quantifiable benefit to the second quantifiable benefit, the first quantifiable cost to the second quantifiable cost, and the first confidence score to the second confidence score. Some embodiments may further include the processor selecting the algorithm with an optimum level of granularity for the text based on these comparisons. Some embodiments may include the processor using the function with the optimum level of granularity to classify the body of text and presenting the findings to a user.

In some embodiments, the disclosure provides for detection and classification of regions of text into pre-defined categories or objects of interest. Text classification may be done in a variety of ways with various granularities. For example, sequence labeling may be utilized to extract an exact span of text containing an object of interest and classifying that span into a key category. In another example, sentence classification may be used to conduct classification at sentence-level to determine whether the sentence contains one or more objects of interest. Regions of text to be classified may be free-form or structured.

It may be beneficial to describe certain terms relevant to the disclosure.

The present disclosure discusses the analysis of a body of text on varying levels of granularity. A text body, also called a body of text, may be any grouping of recorded data. For example, a text body may be a book, an article, a website, a script, a consumer database, a customer review, an email, a template, a data sheet, a dialogue, multiple of any of the above, or any combination thereof, among other things. A text body may be in any number of formats such as written, audio, visual, or a combination thereof. In some embodiments of the present disclosure, it may be preferable to analyze written data.

A text segment is a sample of text. It may be a part of a larger body of text. A text segment may be a selection of text such that the selection was intentionally and selectively made by a user or a processor. A text segment may also be a random selection from a body of text. Alternatively, a text segment may be a stratified random selection of text; for example, if a body of text is a book, a text segment compiled in a stratified and random fashion from the book may be a paragraph randomly selected from each chapter of the book.

Granularity, also known as graininess, refers to coarseness or fineness. An analysis with a coarse granularity has larger subsections than one with a fine granularity. Varying granularities offer different informational details. For example, in one application, it may be preferable to use a coarse granularity to answer one inquiry whereas a different inquiry may be better answered with a fine-grained approach. For example, in sentiment analysis of customer reviews, a budding entrepreneur may want to know the general tone of reviews for a certain type of business and therefore use an industry-wide granularity level to view business ratings overall within the industry; in contrast, a restauranteur may be specifically interested in the sentiment of the reviews of a particular restaurant and thus a finer-grained method of individual reviews may be a more appropriate avenue of analysis.

Granularity is a relative reference; a coarse-grained approach in one context may be a fine-grained approach in another. For example, a distance of a mile may be a coarse-grained approach in the context of a car drive to a nearby grocery store and a fine-grained approach in the context of a spaceship traveling to Jupiter.

Several levels of granularity may be used in an analysis. For example, the sentiment of a book may be analyzed with a coarse-grained approach of analyzing a chapter, a medium-grained approach of analyzing a paragraph, and/or a fine-grained approach of analyzing a sentence. In another example, the health of a forest may be analyzed by assessing the ecosystem the forest is in, the forest itself, an individual tree within the forest, a leaf on the tree, or the health of a particular organism on the leaf.

Varying levels of granularity may be used to locate, identify, classify, or otherwise note an object of interest. An object of interest, also called an item of interest, may be a focus or target of attention or an inquiry. For example, referring to the forest example above, an object of interest may be the health of the forest. In another example, an object of interest may be the sentiment from a customer review. Some disclosures, contexts, or inquiries may have a single object of interest whereas other disclosures, contexts, or inquiries may have more than one.

Differing levels of granularity may provide different accuracies and precisions for identifying one or more objects of interest. Accuracy refers to the nearness various attempts are to a specified target. Precision refers to how near attempts are to each other. A coarse-grained analysis approach may result in high accuracy while sacrificing precision; such a result might be very close to the bullseye of the target, but it may also be vague. Alternatively, a fine-grained analysis approach may result in high precision while sacrificing accuracy; such a result might be extremely clear but distant from the bullseye of the target. Varying levels of granularity offer different strengths.

One level of granularity may be more helpful than one or more other levels of granularity for certain objects of interest and/or in certain contexts. Further, coarse-grained and fine-grained analytical approaches may be complementary (e.g., together they add more visibility/insight to defining/confirming an object of interest); combining, comparing, and contrasting the approaches may be useful for striking an appropriate balance between accuracy and precision.

Various techniques exist with differing granularities for classifying data. Each method has strengths and weaknesses based on the target of the method and the level of granularity used.

One technique of classifying data is sequence labeling. Sequence labeling is a form of pattern recognition in which a tag is assigned to each part of a series. The benefits of sequence labeling include that the model can detect exact spans of text containing a specified object of interest. Additionally, sequence labeling is more robust than other approaches as it does not require sentence boundary formation. A detriment to using sequence labeling is that the accuracy tends to be lower than other methods.

Another technique of classifying data is sentence classification. Sentence classification involves tagging a sentence as a whole. An advantage of sentence classification is that it tends to have higher accuracy than other methods. However, the difficulties include that the sentence classification method does not offer results highlighting exact spans of text of interest. Another shortcoming of sentence classification is that the method is less robust because it requires sentence boundary information.

Different contexts, inquiries, users, preferences, risk tolerances, or other information may determine preferences for a model or a model output. For example, in one context with one inquiry, a user may prefer very accurate results at the expense of precision; in contrast, a different user proffering the same inquiry in the same context may prefer clearer results that may not be as accurate. For instance, a first user may be interested in accurately approximating the direction of an industry to predict trends whereas a second user may be interested in the decisions that result in the direction of the industry to anticipate logistical business needs.

Various metrics may be used to assess models and model predictions. Metrics may be used to assess whether models and their predictions are suitable for use for given contexts, inquiries, users, preferences, risk tolerances, and other information.

A model may be used with different granularity variables. A granularity variable, also called a granularity level or level of granularity, is a finite number associated with a model based on its relative granularity. Granularity levels may be integer values ordered from finest-grain having the lowest number to the coarsest-grain having the highest number.

A set of granularity levels, also called a granularity set, may be expressed as:

$$G=\{1,2,\ldots,L\}$$

wherein 1 is the finest granularity level of the selected models and L is the coarsest granularity level of the selected models.

An accuracy metric may also be associated with each model at each granularity. An accuracy metric may be scalar such that it has a magnitude and lacks direction. An Fi score is an example of a scalar. An accuracy metric may also be a vector, meaning it includes both a magnitude and a direction. An accuracy metric that is a vector may include a precision score, a recall score, and other metrics. Accuracy may be calculated over a test set of data.

Accuracy may be expressed as:

$$a(m_i)$$

wherein a is the accuracy for the model $m_i$ wherein i denotes the granularity level.

While the above formula represents one model and demonstrates one expression of accuracy, any number of granularity levels may be used per model. Different expressions of accuracy may be used. In embodiments using multiple models per granularity level, accuracy may also be expressed as:

$$a(m_{i,j})$$

wherein j denotes the model identifier.

Each model may also have a latency metric. A latency metric is the measurement of the expected latency of the model to complete the classification inquiry for a document of an average size. Latency references a delay between a command to transfer data and the start of the data transfer.

A latency metric may be expressed as:

$$t(m_i)$$

wherein t is the latency for the model $m_i$ wherein i denotes the granularity level.

A benefit function, which may also be called a revenue function, may be calculated based on a granularity variable. A revenue function may be used to quantify the benefit offered by a specified level of granularity. A benefit function may define a quantifiable benefit such that the numerical value returned from the revenue function is a quantifiable benefit. A revenue function may be defined by a user to specify gain preferences as a function of the achieved accuracy metric, and a benefit function is an increasing function of the accuracy metric.

An example of a benefit function may be:

$$R_u(a)=\beta \cdot a$$

wherein $R_u$ is the benefit function defined based on the preferences of user u, a is the accuracy metric, and β is a non-negative weight vector.

A cost function may be calculated based on a granularity variable. A cost function may measure how much a model deviates from observed data. The higher a cost, the more a model deviates from the data, meaning a worse fit of the model to the data. A cost function may result in a quantifiable cost for a specified level of granularity. A cost function may define a quantifiable cost such that the numerical value returned from the cost function is a quantifiable cost. A user, group, system, or other entity may define a cost function to specify a loss preference as a function of granularity level.

An example of a granularity cost function may be:

$$C_u(g)=\Sigma_{i=1}^{g} C_i$$

wherein $C_u$ is the cost function based on the preferences of user u as a function of granularity g wherein $C_i \geq 0$ for $1 \leq g \leq L$ and the function increases with the granularity level such that a finer-grained model will have a lower $C_u$ than a coarser-grained model.

A cost function may also be calculated based on a latency variable. A cost function may measure how long the implementation of a certain model at a certain granularity will take to analyze the data. The higher the cost, the longer it may take to receive results.

An example of a latency cost function may be:

$$C'_u(t)=bt^2$$

wherein $C'_u(t)$ is a cost function with the preferences of user u as a function of latency metric t wherein $b \geq 0$.

Any reference to a cost function may refer to the cost as a function of granularity $C_u(g)$, the cost as a function of latency $C'_u(t)$, both of these cost functions, other cost functions recognized by those skilled in the art, or a combination thereof.

Revenue and cost functions may be combined into an objective function. An objective function may be used to calculate an optimal selection of a model and/or granularity level. An objective function may help measure the quality of a model and/or offer a quantitative measure of multiple models for comparison of the models.

An example of an objective function may be:

$$J_u(m_i)=R_u(a(m_i))-C_u(g(m_i))-C'_u(t(m_i))$$

wherein $J_u(m_i)$ is the objective function with the preferences of user u as a function of the model m with granularity i, $R_u(a(m_i))$ is the revenue function for the same preferences of user u as a function of accuracy a as it depends on the model m with granularity i, $C_u(g(m_i))$ is the granularity cost function for the same preferences of user u as a function of granularity g as it depends on the model m with granularity i, and $C'_u(t(m_i))$ is the latency cost function for the same preferences of user u as a function of latency metric t as it depends on the model m with granularity i. In this example, $g(m_i)$ is equal to i because model $m_i$ has granularity level i. In this example, a desired model would maximize the value of the objective function.

Revenue, cost, and objective functions may better serve a user when implementing a confidence score. A confidence score may be calculated for a benefit function, a quantifiable benefit, a cost function, a quantifiable cost, other models of prediction, and other results from predictive models. Confidence scoring is a technique for measuring certainty or uncertainty of a model or prediction. A confidence score is a calculation of the likelihood that a model produces correct results or that a predicted result is correct.

A confidence score may be expressed as:

$$s(x, m_i)$$

wherein s is the confidence score for classifying text x with the model m wherein i denotes the granularity level.

Confidence scores may be applied to various models, functions, and results.

An example of a benefit function with a confidence score may be:

$$R_u(a(m_i), s(x, m_i)) = R_u(a(m_i)) \cdot s(x, m_i)$$

wherein $R_u(a(m_i), s(x, m_i))$ is the revenue function for the preferences of user u as a function of accuracy a as it depends on the model m with granularity i and confidence score s which is a function of text x and model m with granularity i, $R_u(a(m_i))$ is a benefit function defined based on the preferences of user u with accuracy metric a as it depends on the model m with granularity i, and s is the confidence score for classifying text x using the model m wherein i denotes the granularity level of the model.

An example of an objective function incorporating a confidence score into the revenue function may be:

$$J_u(x, m_i) = R_u(a(m_i), s(x, m_i)) - C_u(g(m_i)) - C'_u(t(m_i))$$

wherein $J_u(x, m_i)$ is the objective function with the preferences of user u as a function of the model m with granularity i and confidence score s which is a function of text x and model m with granularity i, $R_u(a(m_i), s(x, m_i))$ is the revenue function for the same preferences of user u as a function of accuracy a as it depends on the model m with granularity i and confidence score s which is a function of text x and model m with granularity i, $C_u(g(m_i))$ is the granularity cost function for the same preferences of user u as a function of granularity g as it depends on the model m with granularity i, and $C'_u(t(m_i))$ is the latency cost function for the same preferences of user u as a function of latency metric t as it depends on the model m with granularity i.

An aspect of the disclosure is combining text classifiers of varying granularities and varying accuracies and automatically selecting the optimum model with the optimum granularity. The optimum model and optimum granularity for any application will vary based on user, group, system, or other preferences with respect to accuracy and precision, accuracies of individual classifiers, and confidence scores of the predictions of the classifiers, among other things.

An aspect of the disclosure is selecting an optimum model or optimized level of granularity. In selecting an optimum model and/or optimized level of granularity, a comparative selection value may be used. A comparative selection value is a quantitative assessment of performance of a particular model with respect to preferred parameters. Preferred parameters may be pre-determined, set by a third-party, selected by a user, or otherwise identified. Preferred parameters may be based on the purpose of the model, the risk tolerance of a user, group, or inquiry, or other factors. A comparative selection value may be a confidence score, one or more results from an objective function, or other numerical valuation of a model or predicted value.

Different types of comparative selection values may be used. A relative comparative selection value may be a comparison of one or more comparative selection values. An optimum comparative selection value, also called an optimum selection value or optimum comparative value, is the best of the comparative selection values. An optimum comparative selection value is optimal because it maximizes benefits and minimizes costs. Optimum comparative selection value calculations may differ based on parameters, preferences, users, functions, objects of interest, queries, text, or other variables. An optimum comparative value may be a maximum value; for example, an optimum comparative selection value may be the highest confidence score associated with any of the pertinent functions. An optimum comparative selection value may be a minimum value; for example, an optimum comparative selection value may be the lowest latency cost associated with any of the pertinent functions.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Referring now to FIG. 1, illustrated is a block diagram of a system of processing queries 100 in accordance with some embodiments of the present disclosure. A corpus 102 includes at least one text body 104 (e.g., an article, a book, etc.). A corpus 102 may refer to one or more data sources. A text body 104 comprises one or more text segments 110 and 120. Each text segment 110 and 120 may include one or more items of interest 112, 114, 116 and 122, 124, 126, respectively.

According to some aspects of the invention, a processor 108 may receive the text segment 110 from the corpus 102. The processor 108 may store the text segment 110 as a text segment 110P to a memory 130. The processor 108 may analyze the text segment 110P for items of interest 112P, 114P, and 116P on multiple granularity levels of varying accuracies, select an optimized model and granularity, and present results on a display 106. The results may include the items of interest 112P, 114P, and 116P and/or the optimized model. A confidence score, comparative selection value, or other information about the optimized model, granularity level, results (e.g. items of interest), or the reason(s) for its selection may also be displayed. The processor 108 may analyze the text body 104 with the optimized model and present all items of interest 112, 114, 116, 122, 124, and 126 on the display.

The processor 108 may receive multiple text segments 110 and 120 or an entire text body 104 or corpus 102 to analyze on multiple granularity levels, determine an optimum granularity level and model, and present results on the display. Additional analysis may result in a better fitting, more accurate, or more precise model. Additional analysis may result in a greater computing cost including latency cost.

For example, a websearcher may query "how to make a birdhouse." A plugin running on the websearcher's computer may analyze the text of the query and identify the object of interest as 'birdhouse.' The plugin, using natural language processing, may also identify that the interrogative adverb 'how' is used. From the identification of both the object of interest and the interrogative adverb, the plugin may determine that the best level of granularity for the query may be a high level of granularity (e.g., manuals, books, videos, etc.), but the granularity is limited to the core power of the web searcher's computer. The plugin may then select a medium-high level of granularity and show the top-rated internet video of building birdhouses to the user.

Figure 2:
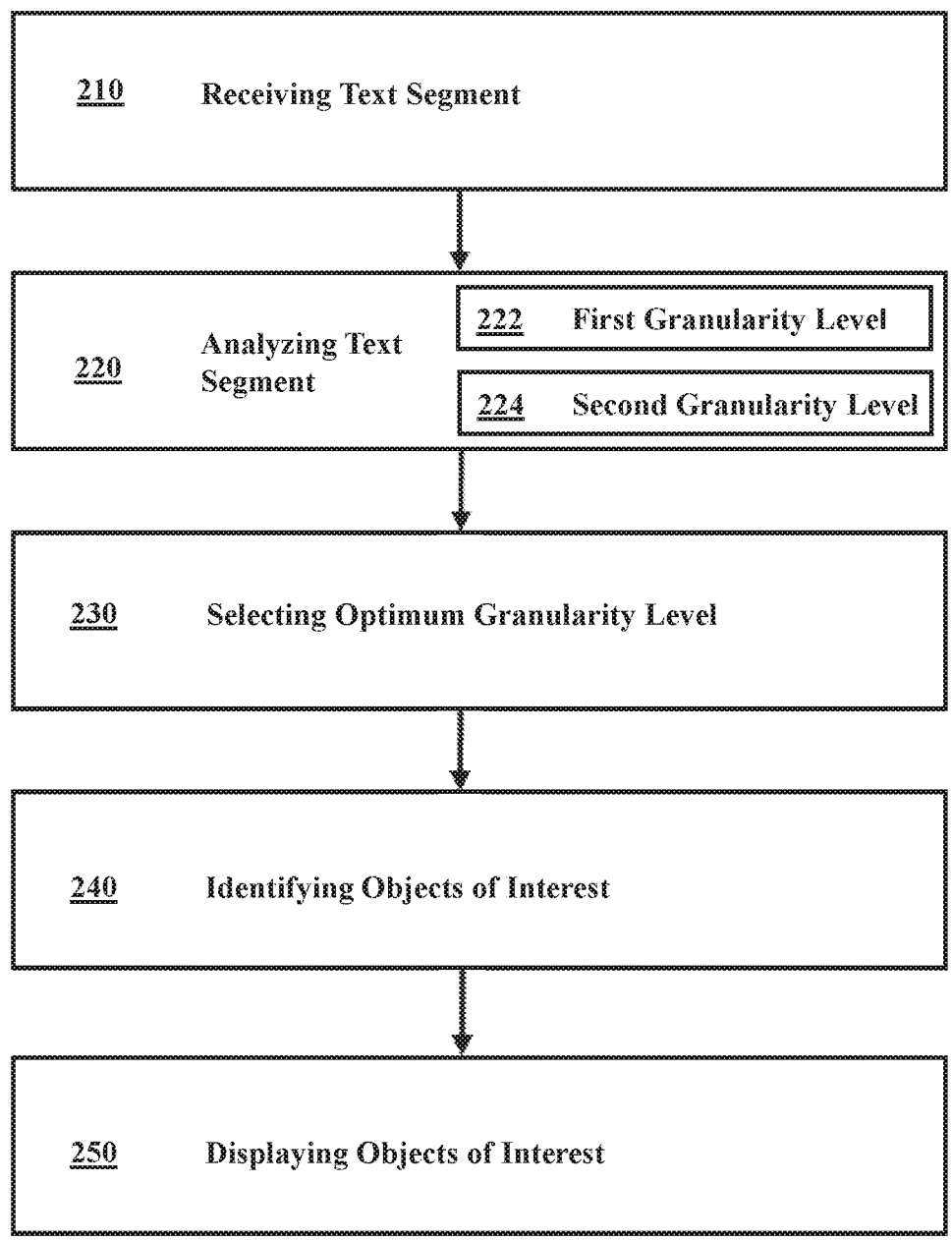
FIG. 2 depicts a flow chart of a method of analyzing text in accordance with embodiments of the present disclosure.

Referring now to FIG. 2, depicted is a flow chart of a method of analyzing text 200 in accordance with some embodiments of the present disclosure. A processor receives a text segment 210 and analyzes the text segment 220 at multiple granularity levels 222 and 224. The processor then selects the optimum granularity level 230 and identifies the objects of interest 240 within the text body the text segment was excerpted from. The processor may also identify the objects of interest 240 within other texts. The processor displays the objects of interest 250 on a display.

The processor may analyze the text segment 220 on a variety of granularity levels. FIG. 2 depicts a first granularity level 222 and a second granularity level 224 for the sake of brevity and clarity. Additional granularity levels, such as a third, fourth, fifth, and so on, may also be employed. One skilled in the art will recognize that any number of granularity levels may be analyzed and compared; just as additional models may be analyzed and compared and additional text may be used to enhance the fit, accuracy, and/or precision of a model, analyzing and comparing multiple granularity levels may incur additional computing cost such as resource and latency costs.

Figure 3:
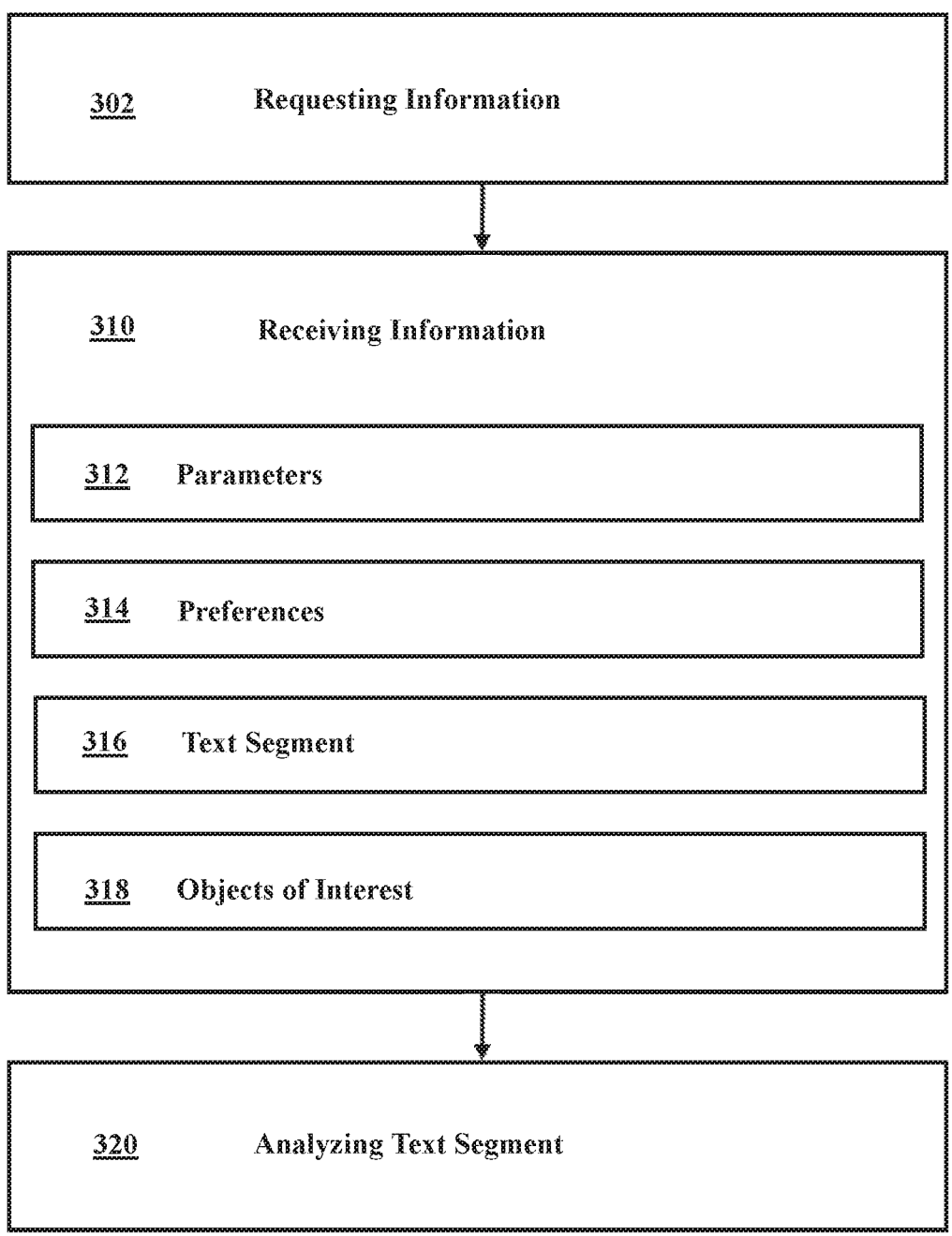
FIG. 3 illustrates a flow chart of a method of preparing for text analysis in accordance with embodiments of the present disclosure.

FIG. 3 illustrates a flow chart of a method of preparing for text analysis 300 in accordance with some embodiments of the present disclosure. A processor may request information 302. A corpus, user, processor, or program may respond to the request. The processor may receive information 310 including, but not limited to, parameters 312, preferences 314, one or more text segments 316, and one or more objects of interest 318. The processor then uses the input data, such as parameters 312, preferences 314, one or more text segments 316, and one or more objects of interest 318, to analyze a text segment 320.

Parameters 312 may include one or more models, granularities, or other information therefor such as boundaries, rules, settings, or other applicable data. Preferences 314 may include user, group, or system preferences. Preferences 314 may include a risk tolerance for any or all variables such as a benefit function, a cost function, an objective function, or a confidence score. Parameters 312 and preferences 314 may be set by a user, a group, a system, automatic generation, or other entities or processes.

Parameters 312 and preferences 314 may be selected specifically for certain models, granularities, inquiries, or systems or may be uniform throughout all applications for a user, group, system, automatic process, or other entity or process. Different users, groups, or systems may combine classifiers in different, new, and unique ways. In some embodiments, a user, group, or system selects the parameters 312 and/or preferences 314 and the processor determines the optimal model based on the parameters 312 and/or preferences 314 identified.

Granularity levels may be among the parameters 312 and/or preferences 314. Certain granularity levels may be used in order to approximate a balance between pinpointing an object of interest versus the issues raised by improperly tagging for an object of interest. This balance may be addressed in risk tolerances, other inputs, and/or may be a separate input.

Figure 4:
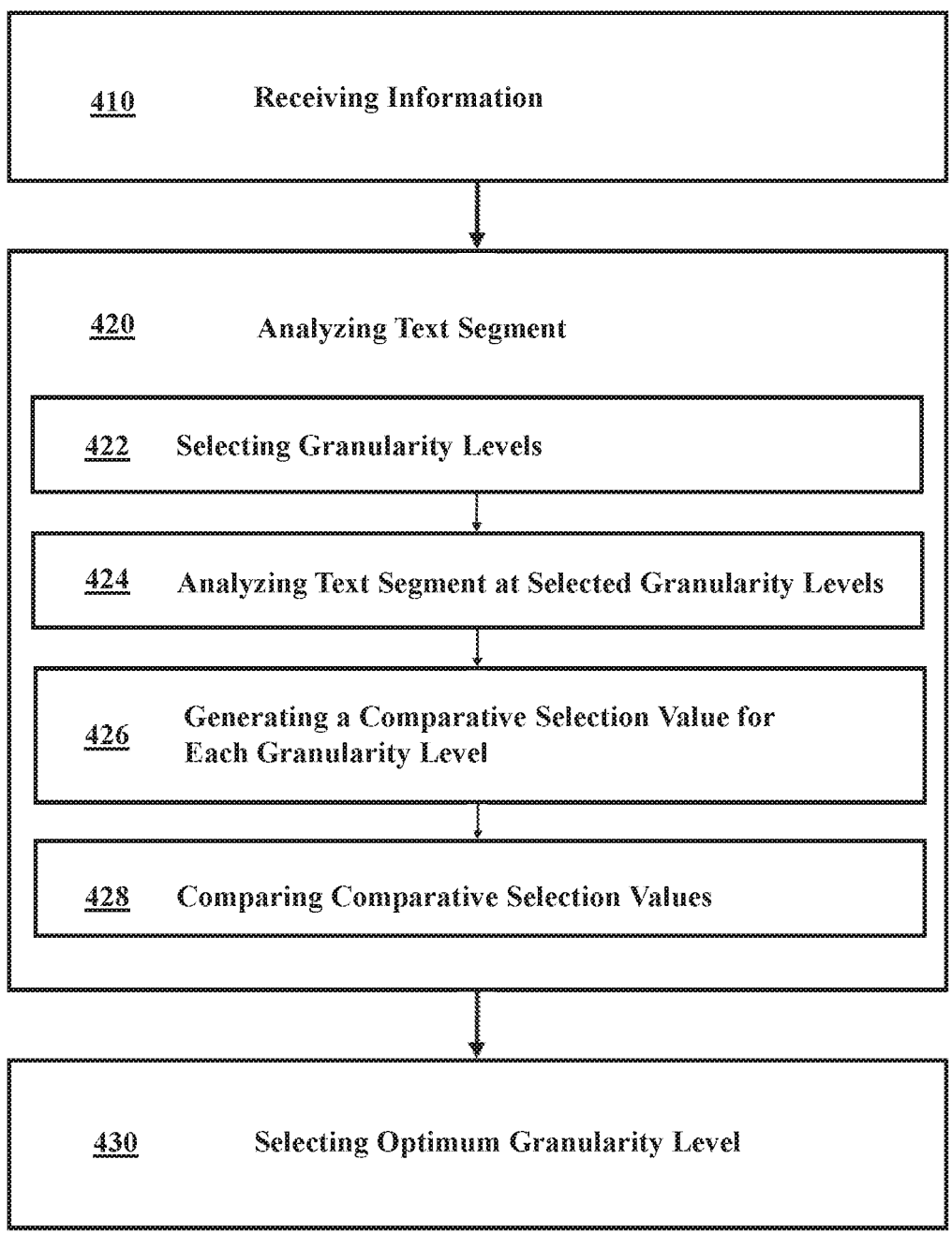
FIG. 4 depicts a flow chart of a method of selecting an optimum granularity level in accordance with embodiments of the present disclosure.

FIG. 4 depicts a flow chart of a method of selecting an optimum granularity level 400 in accordance with embodiments of the present disclosure. A processor receives information 410 and uses the information received to analyze a text segment 420 and select an optimum granularity level 430.

Analyzing the text segment 420 may include selecting granularity levels 422 for the model or models and then analyzing the text segment at the selected granularity levels 424. Analyzing the text segment 420 may also include generating a comparative selection value for each granularity level 426 and comparing the comparative selection values 428.

Various metrics may be used to assess the fitness of various granularities for the purpose of the application at hand. User preferences, which may be quantified by weighting certain factors, may direct the selection of an optimized model, a processor may rely on previous inputs and insights to select an optimum granularity level, or a combination of user direction and processor information may be used. For example, a user may specify a type of query and the processor may guide the user through additional queries to identify specific parameters and preferences for the analysis.

Various preferences may guide the analysis. For example, the analysis may include weighted or non-weighted factors of comparative selection values. A comparative selection value may be, for example, a confidence score, one or more results from an objective function, or other numerical valuation of a model or predicted value.

Text classification may be done on a local computer, on a remote computer, on the cloud, or may use any suitable combination thereof.

An aspect of the disclosure is optimizing the procedure of selecting the best model, algorithm, or method while using the internet. Some embodiments of the disclosure use comparative selection values to enable review of quantitative strengths of options in real time. Some embodiments of the disclosure use confidence scores to approximate accuracy in real time.

Figure 5:
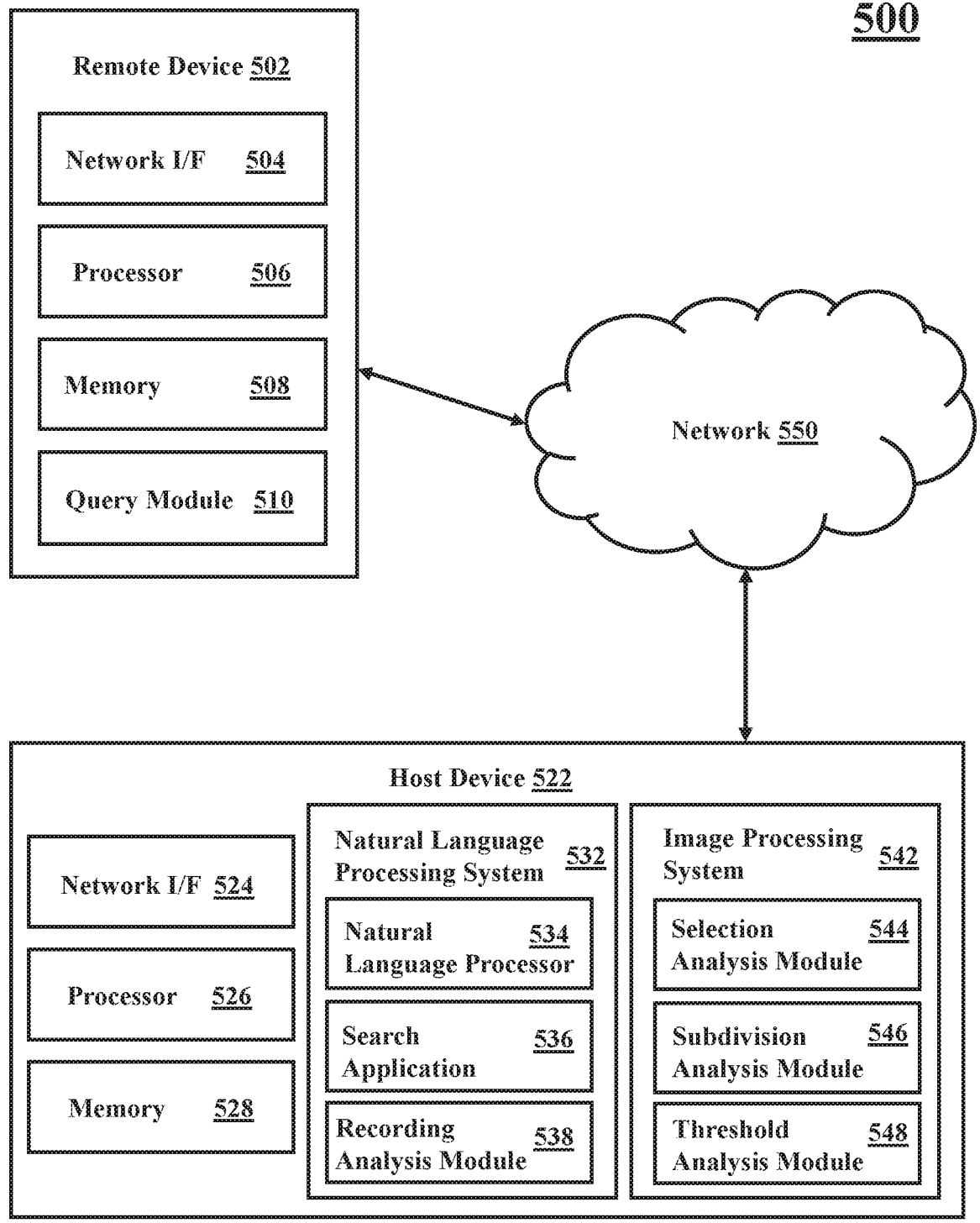
FIG. 5 illustrates a block diagram of an example computing environment in which illustrative embodiments of the present disclosure may be implemented.

Some embodiments of the present disclosure may utilize a natural language parsing and/or subparsing component. Thus, aspects of the disclosure may relate to natural language processing. Accordingly, an understanding of the embodiments of the present invention may be aided by describing embodiments of natural language processing systems and the environments in which these systems may operate. Turning now to FIG. 5, illustrated is a block diagram of an example computing environment 500 in which illustrative embodiments of the present disclosure may be implemented. In some embodiments, the computing environment 500 may include a remote device 502 and a host device 522.

Consistent with various embodiments of the present disclosure, the host device 522 and the remote device 502 may be computer systems. The remote device 502 and the host device 522 may include one or more processors 506 and 526 and one or more memories 508 and 528, respectively. The remote device 502 and the host device 522 may be configured to communicate with each other through an internal or external network interface 504 and 524. The network interfaces 504 and 524 may be modems or network interface cards. The remote device 502 and/or the host device 522 may be equipped with a display such as a monitor. Additionally, the remote device 502 and/or the host device 522 may include optional input devices (e.g., a keyboard, mouse, scanner, or other input device) and/or any commercially available or custom software (e.g., browser software, communications software, server software, natural language processing software, search engine and/or web crawling software, filter modules for filtering content based upon predefined parameters, etc.). In some embodiments, the remote device 502 and/or the host device 522 may be servers, desktops, laptops, or hand-held devices.

The remote device 502 and the host device 522 may be distant from each other and communicate over a network 550. In some embodiments, the host device 522 may be a central hub from which remote device 502 can establish a communication connection, such as in a client-server networking model. Alternatively, the host device 522 and remote device 502 may be configured in any other suitable networking relationship (e.g., in a peer-to-peer configuration or using any other network topology).

In some embodiments, the network 550 can be implemented using any number of any suitable communications media. For example, the network 550 may be a wide area network (WAN), a local area network (LAN), an internet, or an intranet. In certain embodiments, the remote device 502 and the host device 522 may be local to each other and communicate via any appropriate local communication medium. For example, the remote device 502 and the host device 522 may communicate using a local area network (LAN), one or more hardwire connections, a wireless link or router, or an intranet. In some embodiments, the remote device 502 and the host device 522 may be communicatively coupled using a combination of one or more networks and/or one or more local connections. For example, the remote device 502 may be hardwired to the host device 522 (e.g., connected with an Ethernet cable) or the remote device 502 may communicate with the host device using the network 550 (e.g., over the Internet).

In some embodiments, the network 550 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 550.

In some embodiments, the remote device 502 may enable a user to input (or may input automatically with or without a user) a query to the host device 522 in order to identify subdivisions of a recording that include a particular subject. For example, the remote device 502 may include a query module 510 and a user interface (UI). The query module 510 may be in the form of a web browser or any other suitable software module, and the UI may be any type of interface (e.g., command line prompts, menu screens, graphical user interfaces). The UI may allow a user to interact with the remote device 502 to input, using the query module 510, a query to the host device 522, which may receive the query.

In some embodiments, the host device 522 may include a natural language processing system 532. The natural language processing system 532 may include a natural language processor 534, a search application 536, and a recording module 538. The natural language processor 534 may include numerous subcomponents, such as a tokenizer, a part-of-speech (POS) tagger, a semantic relationship identifier, and a syntactic relationship identifier. An example natural language processor is discussed in more detail in reference to FIG. 6.

The search application 536 may be implemented using a conventional or other search engine and may be distributed across multiple computer systems. The search application 536 may be configured to search one or more databases (e.g., repositories) or other computer systems for content that is related to a query submitted by the remote device 502. For example, the search application 536 may be configured to search medical dictionaries, papers, and/or archived medical reports to help identify a particular subject related to a query provided for a health class video. The recording analysis module 538 may be configured to analyze a recording to identify a particular subject (e.g., of the query). The recording analysis module 538 may include one or more modules or units, and may utilize the search application 536, to perform its functions (e.g., to identify a particular subject in a recording), as discussed in more detail in reference to FIG. 5.

In some embodiments, the host device 522 may include an image processing system 542. The image processing system 542 may be configured to analyze images associated with a recording to create an image analysis. The image processing system 542 may utilize one or more models, modules, or units to perform its functions (e.g., to analyze the images associated with the recording and generate an image analysis). For example, the image processing system 542 may include one or more image processing models that are configured to identify specific images related to a recording. The image processing models may include a section analysis module 544 to analyze single images associated with the recording and to identify the location of one or more features of the single images. As another example, the image processing system 542 may include a subdivision module 546 to group multiple images together identified to have a common feature of the one or more features. In some embodiments, image processing modules may be implemented as software modules. For example, the image processing system 542 may include a section analysis module and a subdivision analysis module. In some embodiments, a single software module may be configured to analyze the image(s) using image processing models.

In some embodiments, the image processing system 542 may include a threshold analysis module 548. The threshold analysis module 548 may be configured to compare the instances of a particular subject identified in a subdivision of sections of the recording against a threshold number of instances. The threshold analysis module 548 may then determine if the subdivision should be displayed to a user.

In some embodiments, the host device may have an optical character recognition (OCR) module. The OCR module may be configured to receive a recording sent from the remote device 502 and perform optical character recognition (or a related process) on the recording to convert it into machine-encoded text so that the natural language processing system 532 may perform NLP on the report. For example, a remote device 502 may transmit a video of a medical procedure to the host device 522. The OCR module may convert the video into machine-encoded text and then the converted video may be sent to the natural language processing system 532 for analysis. In some embodiments, the OCR module may be a subcomponent of the natural language processing system 532. In other embodiments, the OCR module may be a standalone module within the host device 522. In still other embodiments, the OCR module may be located on the remote device 502 and may perform OCR on the recording before the recording is sent to the host device 522.

While FIG. 5 illustrates a computing environment 500 with a single host device 522 and a remote device 502, suitable computing environments for implementing embodiments of this disclosure may include any number of remote devices and host devices. The various models, modules, systems, and components illustrated in FIG. 5 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS to generate an image analysis.

It is noted that FIG. 5 is intended to depict the representative major components of an exemplary computing environment 500. In some embodiments, however, individual components may have greater or lesser complexity than as represented in FIG. 5, components other than or in addition to those shown in FIG. 5 may be present, and the number, type, and configuration of such components may vary.

Figure 6:
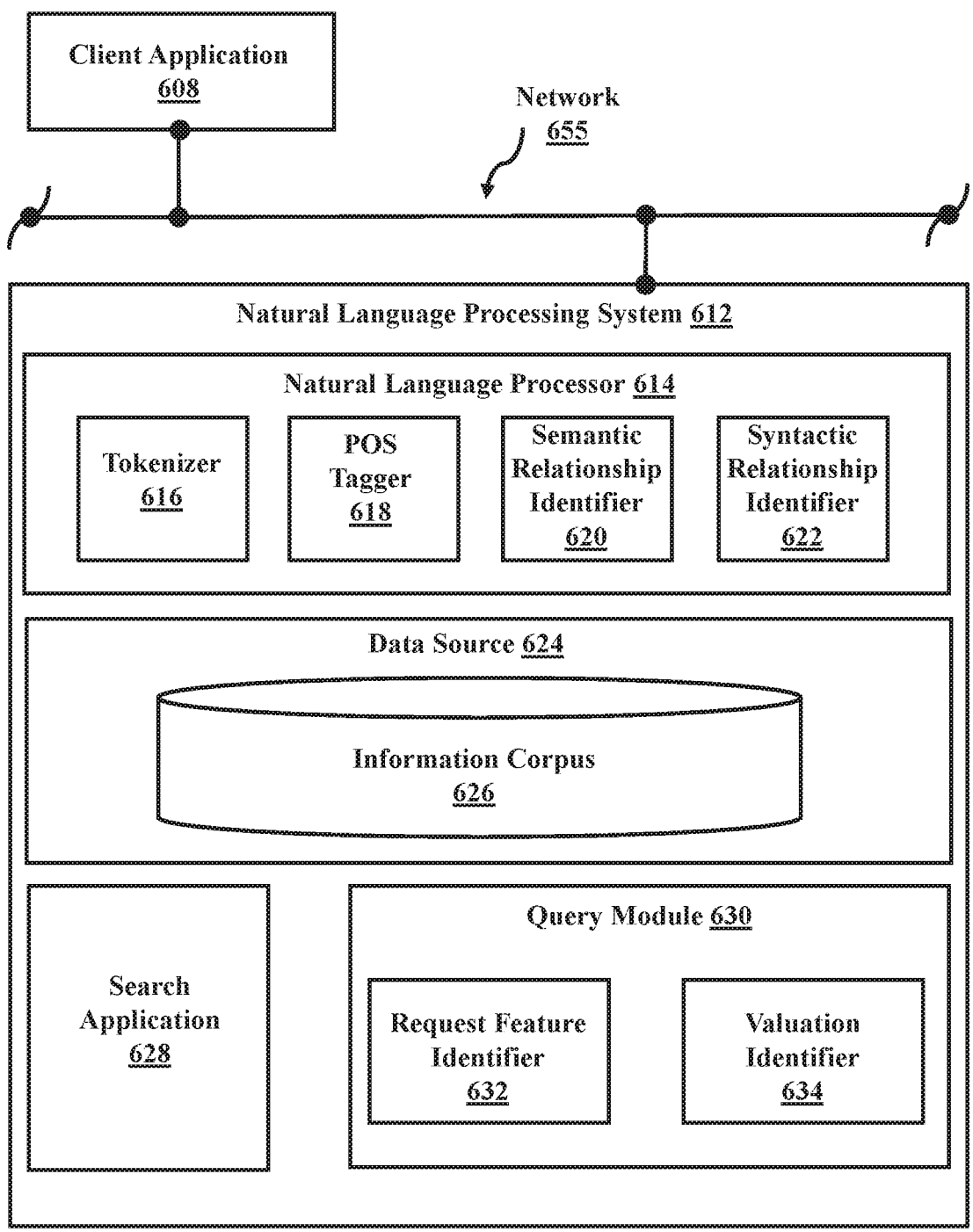
FIG. 6 depicts a block diagram of an example natural language processing system configured to analyze a recording to identify a particular subject of a query in accordance with embodiments of the present disclosure.

Referring now to FIG. 6, shown is a block diagram of an exemplary system architecture 600 including a natural language processing system 612 configured to analyze data to identify objects of interest, in accordance with embodiments of the present disclosure. In some embodiments, a remote device (such as remote device 502 of FIG. 5) may submit a text segment and/or a corpus to be analyzed to the natural language processing system 612 which may be housed on a host device (such as host device 522 of FIG. 5). Such a remote device may include a client application 608, which may itself involve one or more entities operable to generate or modify information associated with the recording and/or query that is then dispatched to a natural language processing system 612 via a network 655.

Consistent with various embodiments of the present disclosure, the natural language processing system 612 may respond to text segment and corpus submissions sent by a client application 608. Specifically, the natural language processing system 612 may analyze a received text segment and/or corpus to identify an object of interest. In some embodiments, the natural language processing system 612 may include a natural language processor 614, data sources 624, a search application 628, and a query module 630. The natural language processor 614 may be a computer module that analyzes the recording and the query. The natural language processor 614 may perform various methods and techniques for analyzing recordings and/or queries (e.g., syntactic analysis, semantic analysis, etc.). The natural language processor 614 may be configured to recognize and analyze any number of natural languages. In some embodiments, the natural language processor 614 may group one or more sections of a text into one or more subdivisions. Further, the natural language processor 614 may include various modules to perform analyses of text or other forms of data (e.g., recordings, etc.). These modules may include, but are not limited to, a tokenizer 616, a part-of-speech (POS) tagger 618 (e.g., which may tag each of the one or more sections of text in which the particular object of interest is identified), a semantic relationship identifier 620, and a syntactic relationship identifier 622.

In some embodiments, the tokenizer 616 may be a computer module that performs lexical analysis. The tokenizer 616 may convert a sequence of characters (e.g., images, sounds, etc.) into a sequence of tokens. A token may be a string of characters included in a recording and categorized as a meaningful symbol. Further, in some embodiments, the tokenizer 616 may identify word boundaries in a body of text and break any text within the body of text into their component text elements, such as words, multiword tokens, numbers, and punctuation marks. In some embodiments, the tokenizer 616 may receive a string of characters, identify the lexemes in the string, and categorize them into tokens.

Consistent with various embodiments, the POS tagger 618 may be a computer module that marks up a word in a recording to correspond to a particular part of speech. The POS tagger 618 may read a passage or other text in natural language and assign a part of speech to each word or other token. The POS tagger 618 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed body of texts and/or corpora (e.g., the content of one text segment may shed light on the meaning of one or more objects of interest in another text segment). Examples of parts of speech that may be assigned to words include, but are not limited to, nouns, verbs, adjectives, adverbs, and the like. Examples of other part of speech categories that POS tagger 618 may assign include, but are not limited to, comparative or superlative adverbs, wh-adverbs, conjunctions, determiners, negative particles, possessive markers, prepositions, wh-pronouns, and the like. In some embodiments, the POS tagger 618 may tag or otherwise annotate tokens of a recording with part of speech categories. In some embodiments, the POS tagger 618 may tag tokens or words of a recording to be parsed by the natural language processing system 612.

In some embodiments, the semantic relationship identifier 620 may be a computer module that may be configured to identify semantic relationships of recognized subjects (e.g., words, phrases, images, etc.) in a body of text/corpus. In some embodiments, the semantic relationship identifier 620 may determine functional dependencies between entities and other semantic relationships.

Consistent with various embodiments, the syntactic relationship identifier 622 may be a computer module that may be configured to identify syntactic relationships in a body of text/corpus composed of tokens. The syntactic relationship identifier 622 may determine the grammatical structure of sentences such as, for example, which groups of words are associated as phrases and which word is the subject or object of a verb. The syntactic relationship identifier 622 may conform to formal grammar.

In some embodiments, the natural language processor 614 may be a computer module that may group sections of a recording into subdivisions and generate corresponding data structures for one or more subdivisions of the recording. For example, in response to receiving a text segment at the natural language processing system 612, the natural language processor 614 may output subdivisions of the text segment as data structures. In some embodiments, a subdivision may be represented in the form of a graph structure.

To generate the subdivision, the natural language processor 614 may trigger computer modules 616-622.

In some embodiments, the output of natural language processor 614 may be used by search application 628 to perform a search of a set of (i.e., one or more) corpora to retrieve one or more subdivisions including a particular subject associated with a query (e.g., in regard to an object of interest) and send the output to an image processing system and to a comparator. As used herein, a corpus may refer to one or more data sources, such as a data source 624 of FIG. 6. In some embodiments, data sources 624 may include video libraries, data warehouses, information corpora, data models, and/or document repositories. In some embodiments, the data sources 624 may include an information corpus 626. The information corpus 626 may enable data storage and retrieval. In some embodiments, the information corpus 626 may be a subject repository that houses a standardized, consistent, clean, and integrated list of images and text. For example, an information corpus 626 may include teaching presentations that include step by step images and comments on how to perform a function. Data may be sourced from various operational systems. Data stored in an information corpus 626 may be structured in a way to specifically address reporting and analytic requirements. In some embodiments, an information corpus 626 may be a relational database.

In some embodiments, a query module 630 may be a computer module that identifies objects of interest within sections of a text, or other forms of data. In some embodiments, a query module 630 may include a request feature identifier 632 and a valuation identifier 634. When a query is received by the natural language processing system 612, the query module 630 may be configured to analyze text using natural language processing to identify an object of interest. The query module 630 may first identity one or more objects of interest in the text using the natural language processor 614 and related subcomponents 616-622. After identifying the one or more objects of interest, the request feature identifier 632 may identify one or more common objects of interest present in sections of the text (e.g., the one or more text segments of the text). In some embodiments, the common objects of interest in the sections may be the same object of interest that is identified. Once a common object of interest is identified, the request feature identifier 632 may be configured to transmit the text segments that include the common object of interest to an image processing system (shown in FIG. 5) and/or to a comparator.

After identifying common objects of interest using the request feature identifier 632, the query module may group sections of text having common objects of interest. The valuation identifier 634 may then provide a value to each text segment indicating how close the object of interest in each text segment came to answering a user's query. In some embodiments, the particular subject may have one or more of the common objects of interest identified in the one or more sections of text. After identifying a particular object of interest relating to the query, the valuation identifier 634 may be configured to transmit the criterion to an image processing system (shown in FIG. 5) and/or to a comparator.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
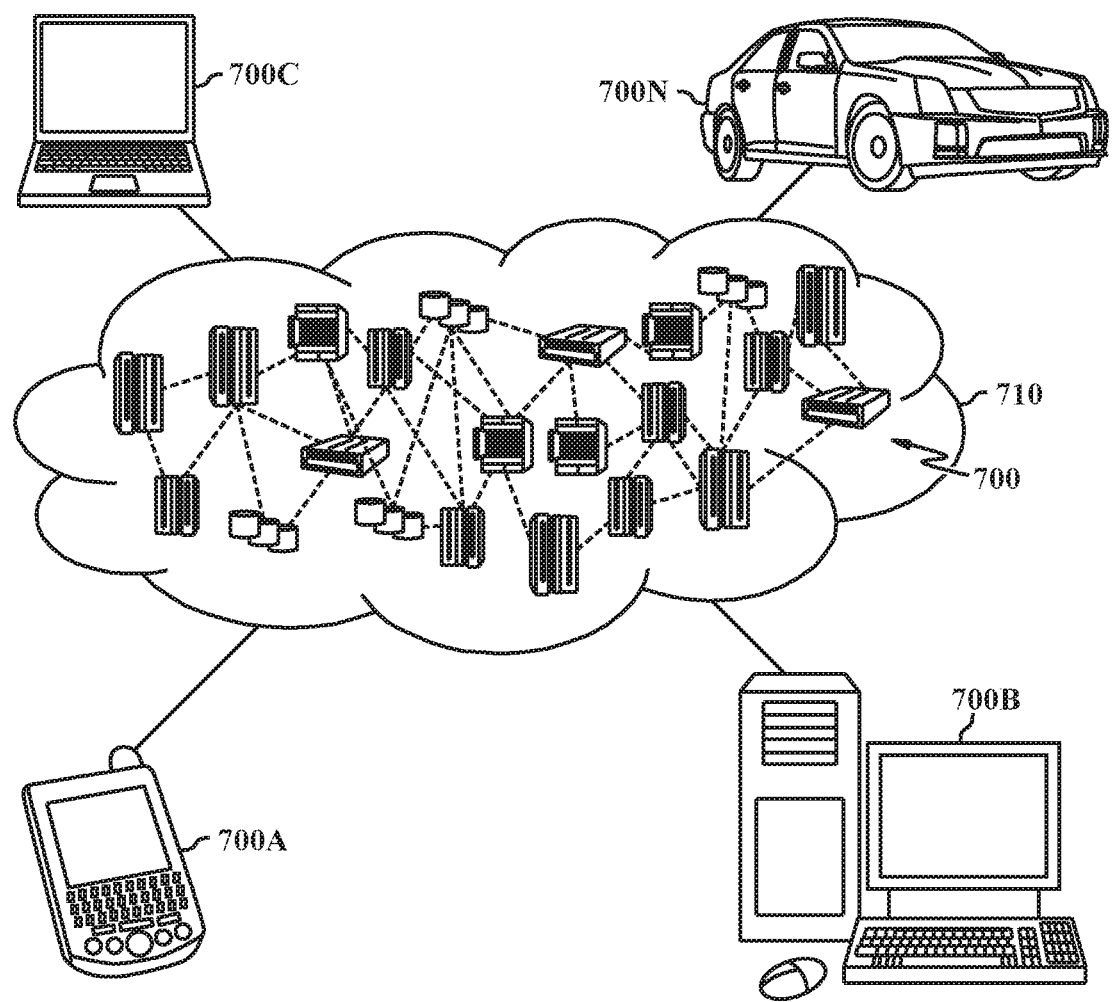
FIG. 7 illustrates a cloud computing environment in accordance with embodiments of the present disclosure.

FIG. 7 illustrates a cloud computing environment 710 in accordance with embodiments of the present disclosure. As shown, cloud computing environment 710 includes one or more cloud computing nodes 700 with which local computing devices used by cloud consumers such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as private, community, public, or hybrid clouds as described hereinabove, or a combination thereof.

This allows cloud computing environment 710 to offer infrastructure, platforms, and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Figure 8:
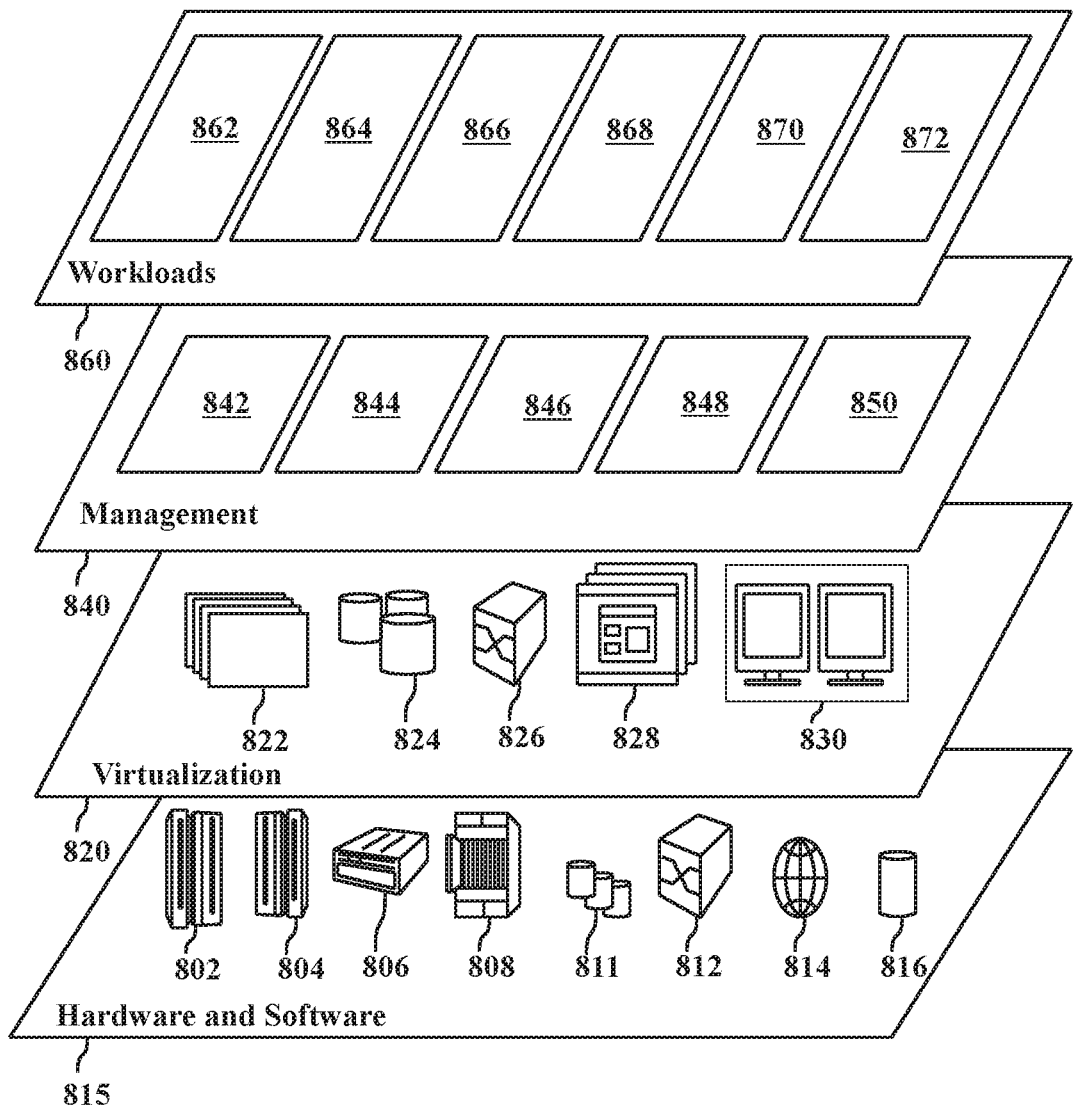
FIG. 8 depicts abstraction model layers in accordance with embodiments of the present disclosure.

FIG. 8 illustrates abstraction model layers 800 provided by cloud computing environment 710 (FIG. 7) in accordance with embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 815 includes hardware and software components. Examples of hardware components include: mainframes 802; RISC (Reduced Instruction Set Computer) architecture-based servers 804; servers 806; blade servers 808; storage devices 811; and networks and networking components 812. In some embodiments, software components include network application server software 814 and database software 816.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 840 may provide the functions described below. Resource provisioning 842 provides dynamic procurement of computing resources and other resources that are utilized to perform tasks within the cloud computing environment. Metering and pricing 844 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 846 provides access to the cloud computing environment for consumers and system administrators. Service level management 848 provides cloud computing resource allocation and management such that required service levels are met. Service level agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment may be utilized. Examples of workloads and functions which may be provided from this layer include: mapping and navigation 862; software development and lifecycle management 864; virtual classroom education delivery 866; data analytics processing 868; transaction processing 870; and text classification using models with complementary granularities and accuracies 872.

Figure 9:
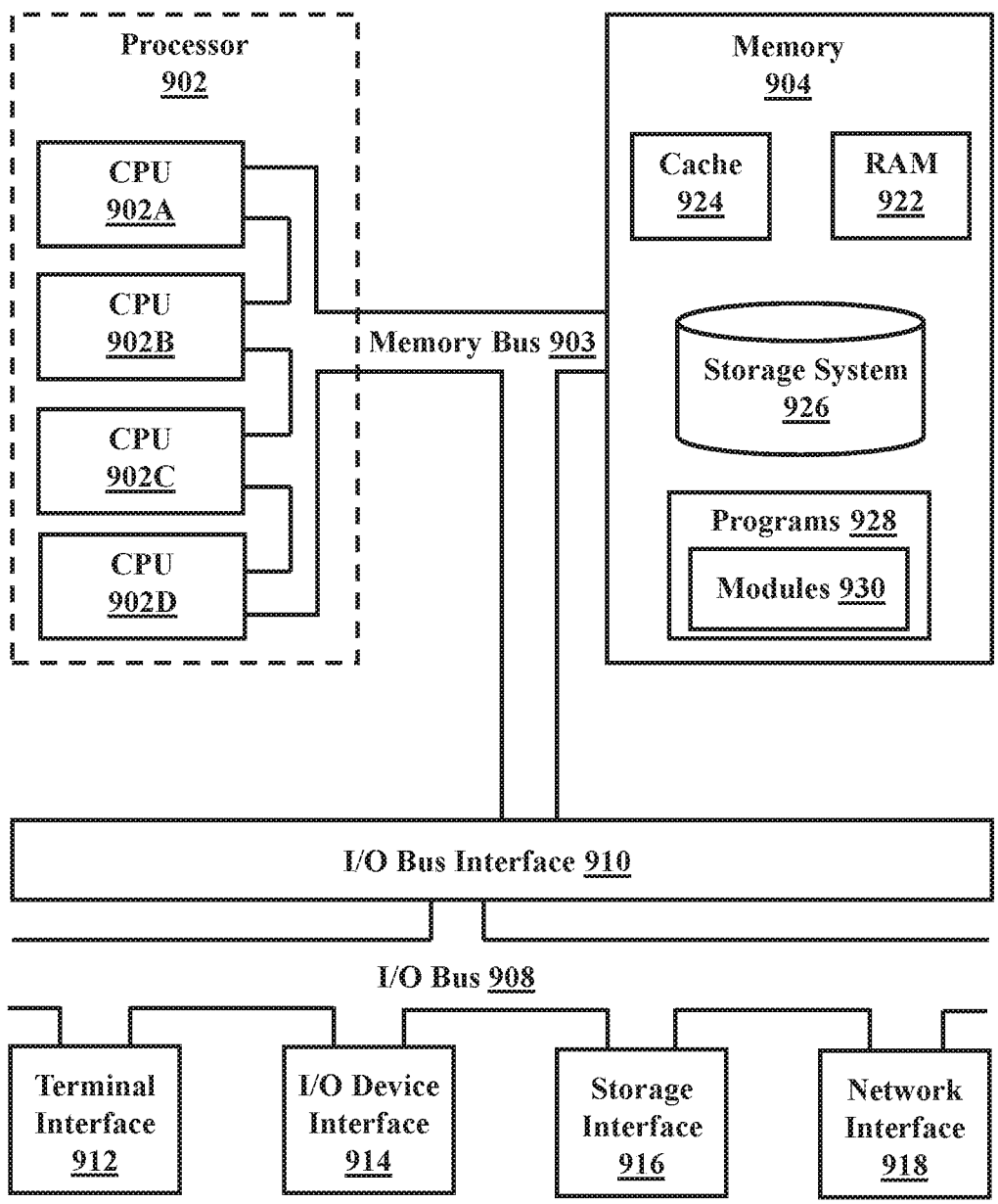
FIG. 9 illustrates a high-level block diagram of an example computer system that may be used in implementing one or more of the methods, tools, and modules, and any related functions, described herein, in accordance with embodiments of the present disclosure.

FIG. 9 illustrates a high-level block diagram of an example computer system 901 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 901 may comprise a processor 902 with one or more central processing units (CPUs) 902A, 902B, 902C, and 902D, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable CPUs 902A, 902B, 902C, and 902D, herein generically referred to as the CPU 902. In some embodiments, the computer system 901 may contain multiple processors typical of a relatively large system; however, in other embodiments, the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 830, may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 928 and/or program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units 910 are shown, which separate the I/O bus 908 from various communications paths running to the various I/O devices, in other embodiments some or all of the I/O devices may be connected directly to one or more system I/O buses 908.

In some embodiments, the computer system 901 may be a multi-user mainframe computer system, a single-user system, a server computer, or similar device that has little or no direct user interface but receives requests from other computer systems (clients). Further, in some embodiments, the computer system 901 may be implemented as a desktop computer, portable computer, laptop or notebook computer, tablet computer, pocket computer, telephone, smartphone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A method for text classification at multiple levels of granularity with different accuracies, said method comprising:
   receiving a text segment via a processor;
   analyzing said text segment on a plurality of granularity levels wherein each of said plurality of granularity levels has a comparative selection value for identifying one or more objects of interest within said text segment;
   selecting an optimized granularity level wherein said optimized granularity level has an optimum comparative selection value;
   identifying said one or more objects of interest within said text segment; and
   displaying said one or more objects of interest to a user.

2. The method of claim 1 wherein analyzing said text segment comprises:
   selecting a first function associated with a first granularity and a second function associated with a second granularity;
   determining a first cost associated with said first granularity and a second cost associated with said second granularity; and
   determining a first benefit associated with said first granularity and a second benefit associated with said second granularity.

3. The method of claim 2 wherein determining said first cost and said second cost comprises:
   identifying a cost function dependent on a granularity variable wherein said cost function quantifies a cost;
   computing said cost function wherein said granularity variable is said first granularity to achieve said first cost;
   computing said cost function wherein said granularity variable is said second granularity to achieve said second cost;
   comparing said first cost to said second cost.

4. The method of claim 2 further comprising:
   comparing said first function to said second function based on comparing said first cost to said second cost and comparing said first benefit to said second benefit;
   generating said comparative selection values wherein said first function has a first comparative selection value and said second function has a second comparative selection value; and
   comparing said first comparative selection value to said second comparative selection value to determine said optimum comparative selection value.

5. The method of claim 2 further comprising:
   computing a first confidence score associated with said first function and a second confidence score associated with said second function; and comparing said first confidence score to said second confidence score to determine said optimum comparative selection value.

6. The method of claim 5 further comprising:
comparing said first function to said second function based on comparing said first cost to said second cost, said first benefit to said second benefit, and first confidence score to said second confidence score;
generating said comparative selection values wherein said first function has a first comparative selection value and said second function has a second comparative selection value; and
comparing said first comparative selection value to said second comparative selection value to determine said optimum comparative selection value.

7. The method of claim 6 further comprising:
generating an optimum function based on said optimum comparative selection value, wherein said optimum function is associated with said optimized granularity level; and
executing said optimum function on a text body to identify said one or more objects of interest within said text body.

8. The method of claim 1 further comprising:
updating said optimized granularity level based on an accuracy of identifying said one or more objects of interest within said text segment.

9. A system for text classification at multiple levels of granularity with different accuracies, said system comprising:
a memory; and
a processor in communication with said memory wherein said processor is configured to perform operations comprising:
receiving a text segment;
analyzing said text segment on a plurality of granularity levels wherein each of said plurality of granularity levels has a comparative selection value for identifying one or more objects of interest within said text segment;
selecting an optimized granularity level wherein said optimized granularity level has an optimum comparative selection value;
identifying one or more objects of interest within said text segment; and
displaying said one or more objects of interest to a user.

10. The system of claim 9 wherein said analyzing said text segment comprises:
selecting a first function associated with a first granularity and a second function associated with a second granularity;
determining a first cost associated with said first granularity and a second cost associated with said second granularity; and
determining a first benefit associated with said first granularity and a second benefit associated with said second granularity.

11. The system of claim 10 wherein determining said first cost and said second cost comprises:
identifying a cost function dependent on a granularity variable wherein said cost function quantifies a cost;
computing said cost function wherein said granularity variable is said first granularity to achieve said first cost;
computing said cost function wherein said granularity variable is said second granularity to achieve said second cost;
comparing said first cost to said second cost.

12. The system of claim 10 wherein said operations further comprise:
computing a first confidence score associated with said first function and a second confidence score associated with said second function; and
comparing said first confidence score to said second confidence score to determine said optimum comparative selection value.

13. The system of claim 12 wherein said operations further comprise:
generating an optimum function based on said optimum comparative selection value, wherein said optimum function is associated with said optimized granularity level; and
executing said optimum function on a text body to identify said one or more objects of interest within said text body.

14. The system of claim 10 wherein said operations further comprise:
comparing said first function to said second function based on comparing said first cost to said second cost and comparing said first benefit to said second benefit; and
generating said optimum comparative selection value.

15. A computer program product for data classification via text analysis, the computer program product comprising a computer readable storage medium having program instructions embodied therewith, said program instructions executable by a processor to cause said processor to perform a function, said function comprising:
receiving a text segment;
analyzing said text segment on a plurality of granularity levels wherein each of said plurality of granularity levels has a comparative selection value for identifying one or more objects of interest within said text segment;
selecting an optimized granularity level wherein said optimized granularity level has an optimum comparative selection value;
identifying said one or more objects of interest within said text segment; and
displaying said one or more objects of interest to a user.

16. The computer program product of claim 15 wherein said function further comprises:
computing a first confidence score associated with a first function and a second confidence score associated with a second function; and
comparing said first confidence score to said second confidence score to determine said optimum comparative selection value.

17. The computer program product of claim 15 wherein said function further comprises:
comparing a first function to a second function based on comparing a first cost to a second cost and comparing a first benefit to a second benefit; and
generating said optimum comparative selection value.

18. The computer program product of claim 15 wherein said function further comprises:
selecting a first function associated with a first granularity and a second function associated with a second granularity;
determining a first cost associated with said first granularity and a second cost associated with said second granularity;

determining a first benefit associated with said first granularity and a second benefit associated with said second granularity;

computing a first confidence score associated with said first function and a second confidence score associated with said second function; and comparing said first cost to said second cost, said first benefit to said second benefit, and said first confidence score to said second confidence score to determine an optimum comparative selection value.

19. The computer program product of claim 15 wherein said function further comprises:

generating an optimum function based on said optimum comparative selection value, wherein said optimum function is associated with said optimized granularity level; and executing said optimum function on a text body to identify said one or more objects of interest within said text segment.

20. The computer program product of claim 15 wherein said function further comprises:

updating said optimized granularity level based on an accuracy of identifying said one or more objects of interest within said text segment.

\* \* \* \* \*